United States Patent
Freber

[15] 3,654,795
[45] Apr. 11, 1972

[54] PROCESS FOR PRODUCING CUP-SHAPED OBJECTS HAVING AXIALLY EXTENDING LIPS

[72] Inventor: Elmer C. Freber, St. Louis, Mo.

[73] Assignee: Marquette Tool and Die Company, St. Louis, Mo.

[22] Filed: Jan. 14, 1970

[21] Appl. No.: 2,855

[52] U.S. Cl. ................................................72/329, 72/336
[51] Int. Cl. ......................................B21d 31/02, B21d 28/00
[58] Field of Search ..................72/329, 330, 336; 113/121 R

[56] References Cited

UNITED STATES PATENTS

| 1,270,933 | 7/1918 | Elsener | 72/329 |
| 2,305,064 | 12/1942 | Colwell | 72/336 |

*Primary Examiner*—Charles W. Lanham
*Assistant Examiner*—R. M. Rogers
*Attorney*—Gravely, Lieder & Woodruff

[57] ABSTRACT

A cup-shaped object having an axially extending lip is produced by blanking a disk from flat stock, coining a recess into the periphery of the disk, and finally forming the disk into a cup-shaped configuration. During the forming step, the peripheral portion of the disk at the coined recess is transformed into an axially extending lip.

10 Claims, 4 Drawing Figures

PATENTED APR 11 1972 3,654,795
SHEET 1 OF 2
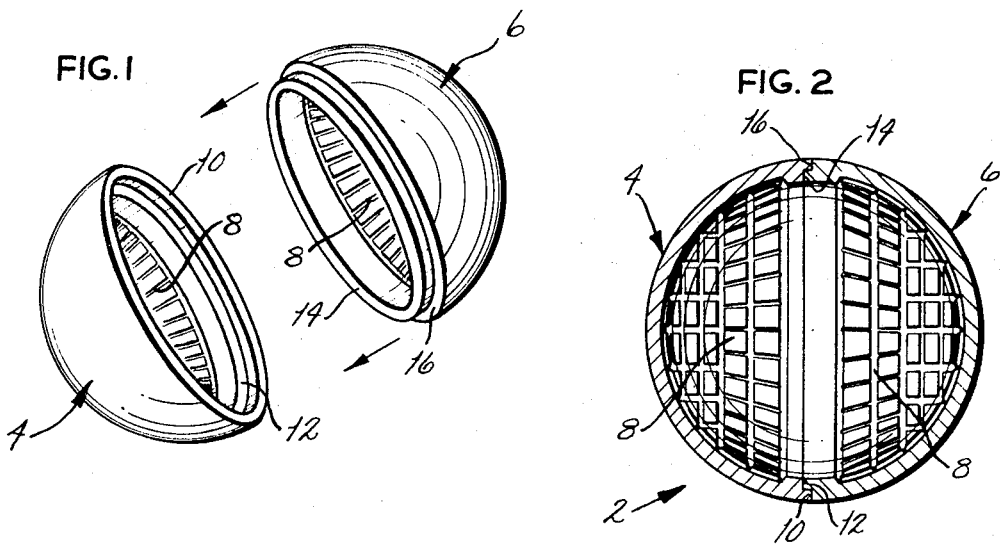
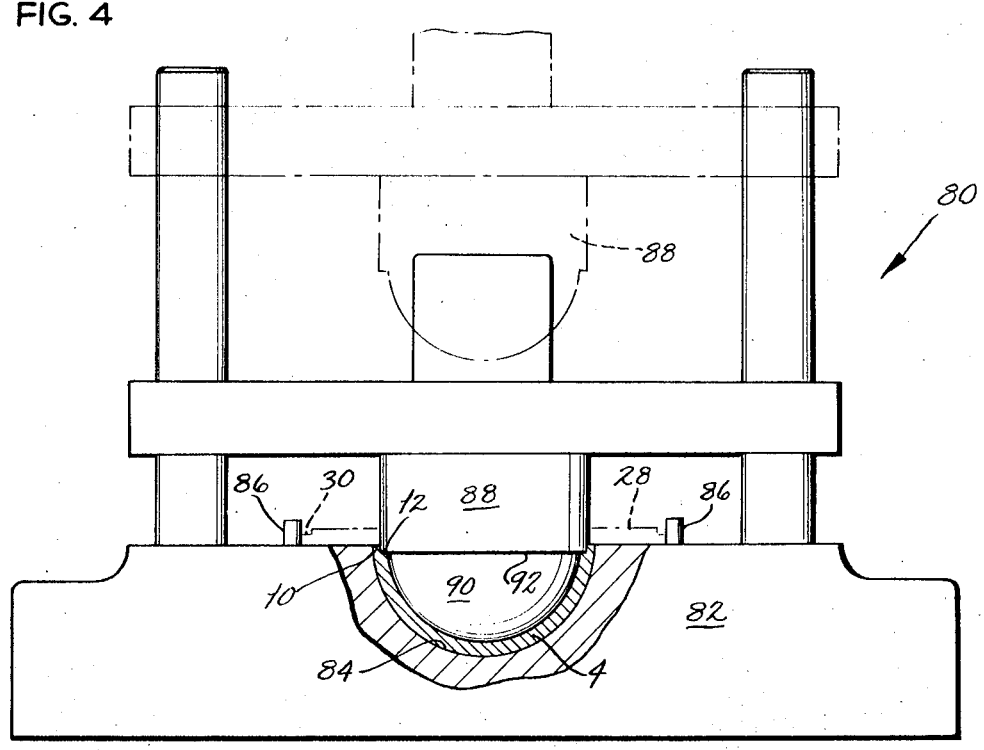
INVENTOR
ELMER C. FREBER
BY Gravely, Lieder & Woodruff
ATTORNEYS

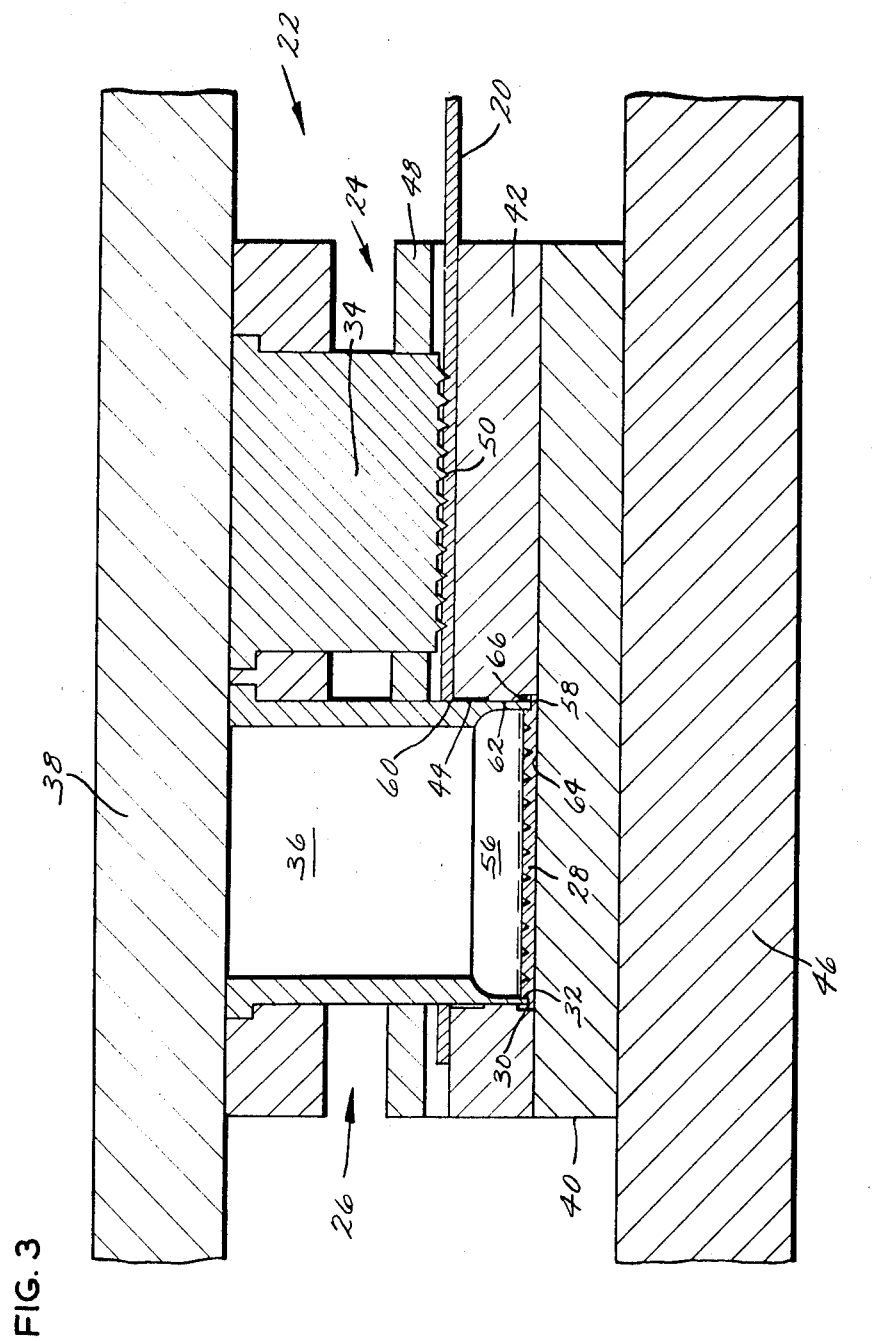

PROCESS FOR PRODUCING CUP-SHAPED OBJECTS HAVING AXIALLY EXTENDING LIPS

BACKGROUND OF THE INVENTION

This invention relates in general to a process and apparatus for forming cup-shaped configurations, and more particularly to a process and apparatus for producing cup-shaped objects having axially extending lips.

Metal cup-shaped configurations are utilized in a number of products, and the cup-shaped configuration alone is easily manufactured merely by placing a flat blank between a simple forming punch and die, both of which possess the desired configuration. However, some products such as magnet housings for loud speakers and hemispherical grenade segments, in addition to the cup-shaped configuration, require an axially extending lip at the open end of the cup. In the case former this lip is upset to capture a magnet in the housing and to also secure the housing to a speaker basket as disclosed in U.S. Pat. No. 3,176,086. In the case of the latter, the lips on two hemispherical grenade segments interfit so as to correctly position the segments relative to one another and thereby create a spherical grenade casing.

While the cup-shaped configuration is easily achieved, the lip at the end of the object possessing such a configuration is not. One method of creating a lip is to hold the cup-shaped object in a chuck and machine the lip into it. Machining, however, requires centering the object with respect to a cutting tool, and furthermore is a relatively time consuming and difficult operation, requiring skilled labor. Furthermore when the cup-shaped object possesses a hemispherical or, even worse, a convex shape it is almost impossible to hold in a chuck with any degree of certainty or precision. Another way of providing a lip on the end of a cup-shaped object is to displace the metal at the open end of the cup-shaped object by a suitable cold working process. This, however, requires heavy presses. Even worse it imparts galls and seizures to the cup-shaped object and cannot be relied upon where close tolerances are required.

SUMMARY OF THE INVENTION

One of the principal objects of the present invention is to provide a process for transforming flat stock into cup-shaped objects having axially extending lips. Another object is to provide a process of the type stated which enables close tolerances to be held. A further object is to provide a process of the type stated in which axially extending lips may be imparted to hemispherical and convex objects. An additional object is to provide a process of the type stated in which shoulders are formed at the bases of the lips. Still another object is to provide a process of the type stated which is extremely simple and economical to perform and does not require extremely heavy and high tonnage presses. Yet another object is to provide an apparatus for performing a process of the type stated. These and other objects and advantages will become apparent hereinafter.

The present invention is embodied in a process which includes blanking a disk from stock, coining a peripherial recess into the disk, and finally forming the disk into a cup-shaped configuration. During the last step the peripheral portion of the disk at the recess is transformed into an axially extending lip. The invention is further embodied in the apparatus for performing the foregoing process. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is an exploded perspective view of a grenade casing formed by the process of the present invention;

FIG. 2 is a sectional view of the grenade casing;

FIG. 3 is a sectional view of a progressive die set used to coin a grid pattern into flat stock, to blank a disk from the flat stock, and to coin a peripheral recess into the blanked disk; and FIG. 4 is a sectional view of a forming die and punch for transforming the disk into a hemispherical configuration.

DETAILED DESCRIPTION

Referring now to the drawings and particularly to FIGS. 1 and 2, the present process may be employed to manufacture spherical grenade casings 2 of the fragmentation variety. The casing 2 consists of two hemispherical segments 4 and 6 of equal radius, and each has a grid pattern 8 cut into its inwardly presented surface to form lines of weakness in the casing 2. The hemispherical segment 4 has an external or female lip 10 projecting from a shoulder 12 at its open end, whereas the hemispherical segment 6 has an internal or male lip 14 projecting from a shoulder 16, the lip 14 being sized to fit snugly within the lip 10. When the segments 4 and 6 are brought together with the lip 14 fitted into the lip 10, the end faces of the lips 10 and 14 will abut the shoulders 16 and 12, respectively, and the segments 4 and 6 will be in perfect alignment, thus creating the spherical casing 2. While the present disclosure will proceed with a discussion of the lips 10 and 12 on the hemispherical grenade segments 4 and 6, it should be understood that the process may also be employed to create lips on magnet housings of the variety disclosed in U.S. Pat. No. 3,176,086 as well as on other cup-shaped configurations. The hemispherical segments 4 and 6 have been chosen for purposes of illustration only, inasmuch as hemispherical shapes are one of the more difficult shapes to hold for machining purposes, and thus they exemplify the advantages of the present process. The process is equally suited for creating cylindrical and convex cup-shaped objects having axially extending lips at their open ends.

Broadly speaking, the process of the present invention involves in progressive operations coining a grid pattern into flat stock, blanking a circular disk from the portion of the stock into which the grid pattern is coined, burnishing the edge of the disk, coining an annular recess and shoulder into the disk, and finally transforming the disk into a hemispherical configuration by the drop of a forming punch into a forming die so as to form the hemispherical segment 4 or 6. The forming operation converts the recessed peripheral portion of the disk into an axially extending lip 10 or 14, whatever the case may be.

Referring now to FIG. 3, flat mill steel stock 20 is initially fed into a progressive punch and die set 22 having two stations 24 and 26. At the first station 24 a grid pattern 8 is coined into the upper surface of the stock 20, while at the second station 26 a circular disk 28 having the previously formed grid pattern 8 in it is blanked from the stock 20, and in addition the edges of the disk 28 are burnished and an annular recess 30 and shoulder 32 are coined into it immediately inwardly from its burnished peripheral edge.

The die set 22 includes a pair of punches 34 and 36 which are attached to the ram of a press by a punch holder 38. The punches 34 and 36 move toward and away from a die 40, and the die 40 includes an anvil 42 located beneath the punch 34 and a die cavity 44 which receives the punch 36. The die 40 is held in proper alignment with the punches 34 and 36 by a die shoe 46 which is mounted on the bed of the press. The punch 34 together with the anvil 42 comprise the first station 24, while the punch 36 and die cavity 44 comprise the second station 26. Both punches 34 and 36 operate through a stripper plate 48 which is presented above the upper surface of the die 40 at a distance somewhat greater than the thickness of the flat stock 20.

The punch 34 on its face presented toward the anvil 42 has a series of crossed ribs 50 formed on it in the reverse configuration of the grid pattern 8. Thus, when the flat stock 20 is placed between the anvil 42 and the stripper plate 48 and the punch 34 descends, the ribs 50 will enter the stock 20 and coin the grid pattern 8 in it.

The punch 36 of the second station 26 has a hollow end portion 56 which terminates at a circular end face 58. The inner diameter of the end face 58 is equal to the diameter of the shoulder 32 on the disk 28, whereas the outer diameter of the end face 58 lies along and forms the lower end of the cylindrical outer surface on the punch 36. The die cavity 44 receives the punch 36, and its upper margin forms a cutting edge 60 which is slightly greater in diameter than the diameter of the punch 36. Below the cutting edge 60 the diameter of the cavity 44 is reduced to form a cylindrical burnishing surface 62. The bottom of the die cavity 44 is defined by a supporting surface 64 and at the supporting surface 64 the side of the cavity 44 is enlarged in the provision of a lateral relief 66. In other words, the supporting surface 64 extends outwardly into the lateral relief 66, the width of which is greater than the diameter of the burnishing surface 62. The punch 36 descends concurrently with the punch 26, and at the point of furthest descent into the cavity 44 the circular end face 58 of the punch 36 will be spaced from the supporting surface 64 a distance approximately equal to the thickness of the disk 28 at the annular recess 30, that is the thickness of the disk 28 immediately beyond the shoulder 32.

While the punches 34 and 36 are in their raised positions, the portion of the flat stock 20 into which the grid pattern 8 had been coined during the previous drop of the punch 34 is moved over the die cavity 44 so that the disk 24 blanked from the stock 20 on the next drop of the punch 36 will have the grid pattern 8 on the upper side thereof. To properly locate the pattern 8 over the die cavity 44, locating holes may be punched into the stock 20 during the drop of the punch 34, and these holes may be engaged with locating pins at the second station 26 in the conventional manner.

Once the grid pattern 8 in the stock 20 is positioned properly over the die cavity 44, the ram of the press is energized, causing the punch 36 to descend and engage the stock 20. As the punch 36 continues to descend toward and across the cutting edge 60 it blanks or shears the circular disk 28 from the flat stock 20. Thereafter the circular disk 28 is forced through the reduced diameter of the cavity 44 at the burnishing surface 62, and its side faces are thereby burnished. Near the end of the stroke of the disk 28 drops into the area of the cavity 44 surrounded by the lateral relief 66. The lower end of the punch 36 continues to move through this portion of the cavity 44, and as it does the disk 28 is pressed against the supporting surface 64 and the annular recess 30 and shoulder 32 are coined into it. As the recess 26 is coined the metal at the periphery of the blanked and burnished disk 28 is displaced outwardly into the lateral relief 66 so that the final diameter of the disk 28 is greater than its burnished diameter. When the punch 36 retracts the disk 28 remains at the bottom of the die cavity 44 due to the increase in diameter, and the flat stock 20 is retained next to the upper surface of the die 40 by the stripper plate 48.

During the same stroke of the punch ram the punch 34 coins another grid pattern 8 into the portion of the flat stock 20 located above the anvil 42. At this junction, it should be noted that it is desirable to have the grid pattern 8 terminate prior to that portion of the disk 28 into which the recess 30 and shoulder 32 are formed during the subsequent drop of the punch 36. By leaving the outer portion of the disk 28 free of the grid pattern, no distortion or undulating configurations are formed at the periphery of the disk 28 as the end face 58 on the punch 36 coins the recess 30 and shoulder 32.

The coined disk 28 left in the relief 66 of the die cavity 44 has the grid pattern 8 and recess 30 exposed on the same side thereof and as will be more apparent hereinafter is suitable for transformation into the hemispherical segment 4 only. To provide a coined disk 28 suitable for transformation into the hemispherical segment 6, the grid pattern 8 and the recess 30 must be formed on opposite sides of the disk 28. This can be achieved by placing the ribs 50 on the anvil 42 instead of on the punch 34.

The disk 28 with the grid pattern 8 and recess 30 coined into it is transferred to another punch and die set 80 (FIG. 4) of the forming variety, and that set includes a die 82 having a hemispherical cavity 84 and a plurality of locating pins 86 surrounding the cavity 84 for positioning the coined disk 28 across it. Inasmuch as the forming operations for creating the hemispherical segment 4 and 6 are substantially the same, only the forming operation for the segment 4 will be described in detail.

The punch and die set 80 also includes a punch 88 having a hemispherical surface 90 which enters the die cavity 84 and a shoulder 92 at the upper end of the hemispherical surface 90. The radius of the hemispherical cavity 84 is substantially equal to the radius of the outer surface of the hemispherical segment 4, but allowance is of course, made for the elasticity of the metal. Similarly, the radius of the hemispherical surface 90 on the punch 88 is substantially equal to the radius of the inner surface of the segment 4, while the shoulder 92 conforms in configuration to the external lip 10 and shoulder 12.

To form the disk 28 into the hemispherical segment 4, the disk 24 is placed between the locating pins 86 on the die 82, in which case it will be positioned centrally over the hemispherical cavity 84. The punch 88 is then forced into the cavity 84, and as it descends it forms or shapes the blank 24 into the hemispherical segment 4. Moreover, during the forming operation, the peripheral portion of the disk 28, that is the portion beyond the shoulder 28, transforms from a radially oriented direction to an axially oriented direction, and in the latter position it is in fact the external lip 10, while the shoulder 32 becomes the shoulder 12. The shoulder 92 at the end of the hemispherical surface 90 on the punch 88 serves to remove any irregularities from the lip 10 and shoulder 12 during the final portion of movement for the punch 88 into the die cavity 84. Since the grid pattern 8 terminates prior to the shoulder 32 on the disk 28 and prior to the shoulder 12 on the segment 4, the transformation into a hemispherical shape does not impart any distortion to the lip 10 or shoulder 12.

The hemispherical segment 6 is formed in a similar punch and die set, only the punch at the upper end of its hemispherical surface is configured to conform to the internal lip 14 and adjacent shoulder 16 and not to the external lip 10 and its adjacent shoulder 12.

As previously noted the forming die 82 and punch 80 need not be hemispherical in configuration, but may possess convex shapes or a cylindrical shape or for that matter practically any type of cup-shaped configuration. Moreover, the grid coining operation at the station 24 of the die set 22 is generally utilized only in connection with the manufacture of grenades, and should of course be omitted where the cup-shaped objects are used for other purposes.

While the process specifically disclosed herein utilizes individual tooling and dies for the most part, the process may also be performed semi-automatically or automatically by employing progressive, transfer, index, or dial feed tooling and dies.

The process of the present invention does not require any machining operations and consequently is quite economical. Notwithstanding the absence of machining, extremely close tolerances are held in the production of the cup-shaped objects. In lieu of expensive machine tools, relatively light presses may be used which can be operated by relatively unskilled labor, and this of course contributes to the economy of the process. Also the process is progressive and no one step involves a large displacement of metal. As a result galls and seizures are practically eliminated.

Further economies are achieved by using flat stock as the basic material. Thus to produce the grenade casing 2, it is not necessary to procure relatively expensive steel having a grid pattern rolled into it. Since the grid pattern 8 is coined into the flat stock by the operator of the process and not rolled in by some remote supplier, the depth of the grid in the hemispherical segments 4 and 6 may be controlled with considerable precision, and this affords better separation of the individual fragments delineated by the grid pattern 8 when an explosive charge in the casing 2 ignites.

This invention is intended to cover all changes and modifications of the example of the invention herein chosen for purposes of the disclosure which do not constitute departures from the spirit and scope of the invention,.

What is claimed is:

1. A process for producing cup-shaped objects having generally axially extending lips, said process comprising blanking a disk from substantially flat stock, coining a grid pattern into the disk, coining a peripheral recess into the disk, and forming the disk into a cup-shaped configuration after the grid pattern and peripheral recess have been coined into it, whereby the portion of the disk formerly located at the recess will be transformed into the generally axially extending lip.

2. A process for transforming substantially flat metal stock into a cup-shaped object having a generally axial extending lip at its open end; said process comprising: blanking a substantially flat disk from the flat metal stock; applying an axially directed compressive force to the flat disk adjacent to the periphery thereof, the force being sufficient in magnitude to coin into the disk a peripheral recess which opens both axially and laterally of the disk, whereby the thickness of the disk is reduced at the peripheral recess; and thereafter forming the disk into a cup-shaped configuration in which the portion of the coined disk immediately inwardly from the periphery thereof is oriented generally in an axial direction, whereby the reduced portion of the disk located at the recess is transformed into an axially extending lip.

3. A process according to claim 2 wherein a shoulder is coined into the disk at the inner margin of the recess as the compressive force is applied, whereby the lip will project from a shoulder when the disk is formed into a cup-shaped configuration.

4. A process according to claim 2 and further characterized by coining a grid pattern into the disk before it is formed into a cup-shaped configuration.

5. A process according to claim 3 wherein the disk is blanked and the recess and shoulder are coined in one strike of a punch into a die cavity.

6. A process according to claim 5 wherein the die cavity has a supporting surface which provides subjacent support for the disk as the recess and the shoulder are coined into the disk; and wherein the cavity is enlarged adjacent to the bottom surface thereof so that the metal displaced by coining the recess flows into the enlarged portion of the cavity, whereby the disk will remain in the cavity when the punch is withdrawn therefrom.

7. A process according to claim 3 and additionally characterized by further forming the lip into the desired configuration as the disk is formed into a cup-shaped configuration.

8. A process according to claim 3 and further characterized by coining a grid pattern into the disk before it is formed into the cup-shaped configuration, the grid pattern being located inwardly from the shoulder at the inner margin of the recess.

9. A process according to claim 2 wherein the disk is formed into a cup-shaped configuration by a forming punch and a forming die.

10. An apparatus for blanking a disk from stock and for creating a peripheral recess in the disk; said apparatus comprising a die having a circular cavity, the upper end of which is defined by a cutting edge and the lower end at least in part by a supporting surface, the die having an outwardly extending relief opening into the cavity at the supporting surface, the diameter of the cavity being reduced between the cutting edge and the relief; and a punch mounted for reciprocal movement into and out of the cavity, the punch having a peripherally extending end face, the outer edge of which is at the end of the side surfaces for the punch and passes adjacent to the cutting edge and walls of the cavity, the punch being adapted to advance its end face into the cavity at least to the location therein where the relief opens into the cavity, whereby when the punch enters the cavity it will blank a disk from stock disposed across the cavity and will thereafter burnish the edge of the disk as the disk advances through the cavity and coin a peripheral recess into the disk when the disk is compressed between the supporting surface of the die and the end face of the punch so as to displace the metal of the disk outwardly into the relief.

* * * * *